US012476956B2

(12) United States Patent
Wegleitner et al.

(10) Patent No.: US 12,476,956 B2
(45) Date of Patent: Nov. 18, 2025

(54) AUTHORIZING AND INITIATING SECURE TUNNELING AND USER-ACCESS TO SERVERS BASED ON USER GROUP AUTHORIZATION INFORMATION IN SECURE COMMUNICATION CERTIFICATES

(71) Applicant: Target Brands, Inc., Minneapolis, MN (US)

(72) Inventors: Catherine L. Wegleitner, Lake Elmo, MN (US); Ryan Michael Gregus, Minneapolis, MN (US); Adam James Kiheri, Escondido, CA (US); Jeffrey Martin Jaynes, Golden Valley, MN (US); Dileep Sivaraman, Plymouth, MN (US); Rajkumar Srinivasan, Minnetonka, MN (US); Mukund Jagan Nathan, Lake Worth, FL (US)

(73) Assignee: Target Brands, Inc., Minneapolis, MN (US)

( * ) Notice: Subject to any disclaimer, the term of this patent is extended or adjusted under 35 U.S.C. 154(b) by 89 days.

(21) Appl. No.: 18/432,500

(22) Filed: Feb. 5, 2024

(65) Prior Publication Data
US 2025/0254155 A1    Aug. 7, 2025

(51) Int. Cl.
  *H04L 9/40*    (2022.01)
(52) U.S. Cl.
  CPC ........ *H04L 63/0823* (2013.01); *H04L 63/029* (2013.01); *H04L 63/108* (2013.01)

(58) Field of Classification Search
None
See application file for complete search history.

(56) References Cited

U.S. PATENT DOCUMENTS

| 8,769,701 | B2 | 7/2014 | Hinton et al. |
| 9,058,481 | B2 | 6/2015 | Prasad et al. |
| 9,560,036 | B2 | 1/2017 | Hinton et al. |
| 9,923,888 | B2 | 3/2018 | Goel et al. |
| 10,560,445 | B2 | 2/2020 | Mathaiyan et al. |
| 10,666,638 | B2 | 5/2020 | Han et al. |
| 11,075,906 | B2 | 7/2021 | Neilan |
| 11,444,925 | B1 * | 9/2022 | Patimer ................. H04L 67/147 |
| 2016/0323280 | A1 * | 11/2016 | Sade ................... H04L 63/0807 |

(Continued)

*Primary Examiner* — Michael Pyzocha
(74) *Attorney, Agent, or Firm* — Barnes & Thornburg LLP

(57) ABSTRACT

The disclosed technology provides for authenticating access to servers using enterprise credentials. A method can include: generating, by a client device operating within an enterprise environment, a request to access a destination server including a token authenticating a user of the client device, transmitting the request to a computer system that can use the token to obtain the SSH certificate signed by an SSH certificate authority (CA), retrieve, from a data store, authorized group information for the user based on the token, and mint the SSH certificate with the retrieved information. The method can include receiving the SSH certificate with the authorized group information and returning the request and the SSH certificate with the authorized group information to a server to access the destination server. The server can be preconfigured with authorized group credentials corresponding to destination servers, which can include the destination server.

20 Claims, 10 Drawing Sheets

(56) References Cited

U.S. PATENT DOCUMENTS

| | | | |
|---|---|---|---|
| 2019/0044940 A1* | 2/2019 | Khalil | H04L 9/3247 |
| 2022/0407856 A1* | 12/2022 | Jawed | G06F 21/33 |
| 2023/0362162 A1* | 11/2023 | Khare | H04L 63/0807 |
| 2024/0007454 A1* | 1/2024 | Jaynes | H04L 63/0823 |

* cited by examiner

AUTHORIZING AND INITIATING SECURE TUNNELING AND USER-ACCESS TO SERVERS BASED ON USER GROUP AUTHORIZATION INFORMATION IN SECURE COMMUNICATION CERTIFICATES

TECHNICAL FIELD

This document describes devices, systems, and methods related to leveraging certificates with user group authorization information to provide users associated with the certificates streamlined and secure access to various servers and systems.

BACKGROUND

An enterprise data infrastructure can include any number of servers and core network segments. Some data infrastructures or other enterprise networks can have one server. Some data infrastructures or other enterprise networks can have many servers. Each server can require credentials, such as account login information, for a user to access services provided by that server. Each server can require different login information or other types of credentials. A user, for example, can maintain multiple different credentials where each credential is used to access a different server in the enterprise data infrastructure. Similarly, the enterprise data infrastructure can maintain mappings of user credentials to servers within the infrastructure. The mappings can be updated as user credentials are updated and/or users leave, enter, and/or gain/loose access rights to the servers of the infrastructure. Whenever a user logs into or otherwise accesses a particular server in the enterprise data infrastructure, for example, the user can provide the credentials corresponding to that server and the user's credentials can be checked against the mappings to determine whether the user is authorized to access that server. The user can then gain access to that server in the enterprise data infrastructure.

Similarly, the user can access non-core segments and/or servers that are different than the core network segments and servers of the enterprise data infrastructure. To access the non-core segments and servers, the use may maintain different credentials, where each credential is used to access a different non-core segment and/or server. Therefore, whenever the user logs into or otherwise accesses a particular non-core segment, the user may provide the credentials corresponding to that non-core segment to gain access.

SUMMARY

The document generally describes systems, methods, techniques, and middleware technology for providing secure connections (e.g., secure shell ("SSH")) using secure communication certificates (e.g., SSH certificates) for user client devices accessing an enterprise's data infrastructure, as well as non-core segments and servers that are external the enterprise's data infrastructure. As part of the disclosed technology, a secure communication certificate, such as an SSH certificate, can be modified to include user group authorization information indicating groups that a user is part of and that are authorized to access one or more of the non-core segments and servers external the enterprise's data infrastructure. When the user requests to access a destination server that is external the enterprise's data infrastructure, their corresponding secure communication certificate (e.g., SSH certificate) containing the user group authorization information can be transmitted to a gatekeeper server that can validate the certificate and determine whether the user is authorized to access the destination server, based on the group authorization information included in the certificate. If the certificate is validated and the user is part of at least one group that is authorized to access the destination server, the gatekeeper server can open up a secure communication tunnel (e.g., SSH tunnel) and initiate a secure session between the user's client device and the destination server.

The disclosed technology can be used in a variety of ways. For example, the disclosed technology can be used to initiate SSH tunnels that bridge SSH connections from core segments and servers of the enterprise data infrastructure with non-core segments and other servers outside of the enterprise data infrastructure. The disclosed technology provides key-based SSH authentication as part of the enterprise's security to allow users in the enterprise to log into/access servers with their unique Single Sign On (SSO) identities, rather than login credentials that are unique and specific to each of the servers (both servers inside the enterprise data infrastructure and external the infrastructure). The disclosed technology further may include a client-side tool for requesting and renewing SSH certificates with an API that can be configured to issue the certificates that are valid for a predetermined period of time, such as 15 minutes. Such SSH certificates may then be used for key-based SSH authentication on the core segments and servers of the enterprise data infrastructure as well as the non-core segments and other servers outside of this infrastructure.

The disclosed technology can provide for managing access to SSH services in a way that ties user access to an enterprise's IdP functionality. An enterprise's data infrastructure can have any quantity of servers. Some data infrastructures can, for example, be scalable. Any of the non-core segments and servers that are external the enterprise's data infrastructure may also be scalable. With an increased quantity of servers and/or increased scalability, the infrastructure can become more complex and governance and/or auditing of server credentials can become more challenging. The disclosed technology therefore leverages SSH access to an enterprise's existing IdP to allow for SSO functionality in the enterprise's infrastructure to extend to SSH access of the enterprise's data infrastructure and non-core segments and servers that are external the enterprise's data infrastructure. With the disclosed technology, instead of every server using various credentials, such as non-specific account names like "local_user", a user with a unique SSO identity can access SSH servers using that unique identity. The unique SSO identity can be, as an illustrative example, "Jane.Doe." The enterprises's IdP functionality may identify the user by "Jane.Doe@domain.com," which can then be used to extend SSH access for the user across the various servers.

One or more embodiments described herein can include a method for authenticating access to one or more servers using enterprise credentials, the method including: generating, by a client device operating within an enterprise environment, a request to access at least one destination server, the request including a token authenticating a user of the client device within the enterprise environment, transmitting, by the client device, the request to a computer system that can be configured to mint and sign a secure shell (SSH) certificate for a user of the client device, the computer system being configured to use the token to obtain the SSH certificate signed by an SSH certificate authority (CA), and the computer system can further be configured to (i) retrieve, from a data store, authorized group information for the user based on the token, and (ii) mint the SSH certificate with the retrieved authorized group information, receiving, by the client device, the SSH certificate with the authorized group information signed by SSH CA based on the token, and returning, by the client device, the request and the SSH certificate with the authorized group information to a server to access the at least one destination server, the server being preconfigured with authorized group credentials corresponding to a group of destination servers, the group of destination servers including the at least one destination server.

In some implementations, the embodiments described herein can optionally include one or more of the following features. For example, the at least one destination server can be external the enterprise environment. The at least one destination server can be within the enterprise environment. The server can be a tunnel server, and the group of destination servers can include the tunnel server.

The method can optionally include receiving, by the client device, a notification indicating that a secure tunnel connection can be established between the client device and the at least one destination server, based on a determination, by the server, that the authorized group information in the SSH certificate corresponds to the authorized group credentials, and remotely accessing, by the client device, the at least one destination server based on establishing an interactive SSH session with the at least one destination server using the secure tunnel connection. The method can include authenticating, by the client device, the user with an enterprise identity provider ("IdP") system that can be configured to authenticate the user based on user enterprise credentials transmitted by the client computing device to the enterprise IdP system, the user enterprise credentials including at least an enterprise identifier for the user, and receiving, at the client device and in response to the user being authenticated, the token from the enterprise IdP system, the token authenticating the enterprise credentials for the user within the enterprise environment.

In some implementations, minting the SSH certificate can include setting a time to live (TTL) for the SSH certificate, the TTL can include a time period during which the SSH certificate can be valid to authenticate remote access to the at least one destination server. The TTL can be 15 minutes from minting the SSH certificate. When the TTL expires, the computer system can be configured to mint and sign a new SSH certificate for the user of the client device. The authorized group information for the user can include credentials corresponding to groups that the user may be part of and that have access to one or more servers, the one or more servers being at least one of (i) within the enterprise environment and (ii) external the enterprise environment.

The method can also include updating, by the client device, an SSH agent on the client device to use the SSH certificate with the authorized group information for the user. The at least one destination server can further be configured to authenticate remote access by the client device based, at least in part, on a determination of whether the authorized group information in the SSH certificate corresponds to a particular authorized group credential that can be associated with the at least one destination server. Each of the group of destination servers can be preconfigured with authorized group credentials corresponding to the destination server. The SSH certificate can include one or more extensions, the extensions including at least one of: permit port forwarding, permit agent forwarding, and permit pty. The SSH certificate can include a unique identifier for the user of the client device. The unique identifier can include a personal LAN ID for the user within the enterprise environment. The unique identifier can include an enterprise identifier of the user used for logging the user into the enterprise environment. The SSH certificate can include a public key of a key pair generated for the SSH certificate, the public key being at least used by the SSH CA to sign the SSH certificate. The computer system can be a certificate service that can be configured to generate and store a public-private key pair based on the token for the user, to provide the public key to the SSH CA for signing, and to provide the signed public key to the client device as the SSH certificate.

One or more embodiments described herein can include a system for authenticating access to one or more servers external an enterprise environment using enterprise credentials, the system including: an enterprise environment, a client device operating within the enterprise environment, a group of destination servers, and a tunnel server that can be configured to perform an authentication process to authorize a request from the client device to access at least one destination server of the group of destination servers, the tunnel server being preconfigured with authorized group credentials corresponding to the group of destination servers. The system has a computer system that can be configured to (i) identify authorized group information for users of client devices within the enterprise environment and (ii) mint and sign secure shell (SSH) certificates with the authorized group information for the users of the client devices within the enterprise environment. The client device can be configured to perform operations that include: generating a request to access the at least one destination server amongst the group of destination servers, the request including a token authenticating a user of the client device within the enterprise environment, transmitting the request to the computer system, the computer system being configured to use the token to (i) obtain an SSH certificate signed by an SSH certificate authority (CA), (ii) identify authorized group information for the user based on the token, and (iii) mint the SSH certificate with the retrieved authorized group information, receiving the SSH certificate with the authorized group information signed by SSH CA, and returning the request and the SSH certificate with the authorized group information to the tunnel server to access the at least one destination server.

The system can optionally include one or more of the abovementioned features.

The devices, system, and techniques described herein may provide one or more of the following advantages. For example, the disclosed technology reduces or otherwise eliminates potential risk of secure key compromise (which may be a risk with SSH agent forwarding techniques) by establishing an SSH tunnel that is like a VPN connection between a user's client device and a destination server. The tunnel connection can provide an encrypted, secure connection between the client device and the destination server using secure communication protocol access, even where the destination server is an untrusted or unknown server. Similarly, the disclosed technology may prevent malicious use, and thus secure network connections, by restricting tunnels to non-core segments and servers external an enterprise data infrastructure using only SSH traffic.

As another example, the disclosed technology establishes a secure tunnel, such as an SSH tunnel, which can deter or otherwise prevent users from trying to access end points that they are not authorized to access. A combination of certificates and the SSH tunnel can be used to build a "firewall" intended to filter out those users and allow ultimate end point authorization. Using the SSH tunnel as a type of "firewall" can improve security of the enterprise network, reduce a need for and amount of firewall rules for the enterprise network, and reduce a need for payment card industry (PCI) controls for every device, server, and/or computer system in the enterprise network. Rather PCI controls can be applied to only an intermediate or tunnel server, which acts as the 'firewall' by validating a certificate and granting access to the end point.

The disclosed technology can also provide for secure logging with existing authorization patterns in an enterprise data infrastructure to address a security concern of non-repudiation (e.g., inability to deny action). Non-repudiation can be addressed with the disclosed technology by issuing SSH certificates to a user's local area network identifier (LanId), or other credential(s), and logging the user's access and activities on and across SSH servers of the enterprise's data infrastructure and external the infrastructure. Logging the activities of the user can also be beneficial to identify or otherwise detect suspicious behavior, unauthorized behavior, or other behavior that may be atypical for the particular user or for users associated with the infrastructure. Logging the activities using the disclosed technology can provide an added security measure to help the enterprise identify, address, and prevent potential security risks associated with the enterprise's data infrastructure.

As another example, the disclosed technology combines security logging with existing authorization patterns in the enterprise data infrastructure to address a security concern in key management. Typically, key management requires safeguarding a private key in a secure place and rotating a private-public key pair on a regular interval. The disclosed technology, on the other hand, incorporates governance techniques such that SSH certificates may expire within a threshold amount of time (such as 15 minutes) and cause a new certificate to be issued for the user's next log in. As a result, a need for key management can be eliminated in the enterprise's data infrastructure and related non-core segments and servers external the enterprise's infrastructure.

The disclosed technology is lightweight, lean, and modular, and can be easily and efficiently deployed in different types of networks, data infrastructures, and other ecosystems to provide secure and trusted access to users associated with the infrastructure. Because the disclosed technology is lean, processes for granting access and authorizing users to various different components in the data infrastructure and external the infrastructure can be streamlined. One process, for example, can be performed that authenticates the user's access across all core segments of the infrastructure and non-core segments external the infrastructure, instead of requiring each segment to perform separate or unique processes, which can be tedious, time consuming, and cause complexity in mapping user login credentials across the segments. Moreover, the disclosed technology is lightweight and lean because it is focused on authenticating a user as the person they say they are. The disclosed technology can act like a digital fingerprint that, once authenticated, makes the user known and trustworthy to the infrastructure and thus granted access to various components of the infrastructure and external the infrastructure without requiring additional access and/or authentication processes at each of the segments to be performed.

Additionally, the disclosed technology is lightweight and lean because it does not require governance or keeping track of and maintaining hundreds, thousands, or more local or enterprise accounts and/or login credentials associated with the users in order to authenticate and authorize any of those users to access components (e.g., services, servers) of the infrastructure and associated with the infrastructure. The disclosed technology does not require complex account and mapping of various different login credentials across servers, services, systems, or other components. As a result of leveraging key-based SSH authentication and group-based authorization with enterprise IdP identities, users can be more quickly and accurately authenticated and granted access across the components that are part of the infrastructure and external the infrastructure.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to techniques for leveraging secure communication protocols, including but not limited to SSH certificates and SSH protocols, having group authorization information to grant users associated with the certificates access to one or more destination servers external an enterprise's data infrastructure. A user's SSH certificate can be validated and their group authorization information can be checked against groups that are authorized to access the destination server(s). If validated and authorized to access the destination server(s), the disclosed technology can establish an SSH tunnel between the user's client device and the destination server(s) providing a secure interactive session there between. The disclosed technology can be applied to SSH as well as other secure communication protocols.

Figure 1A:
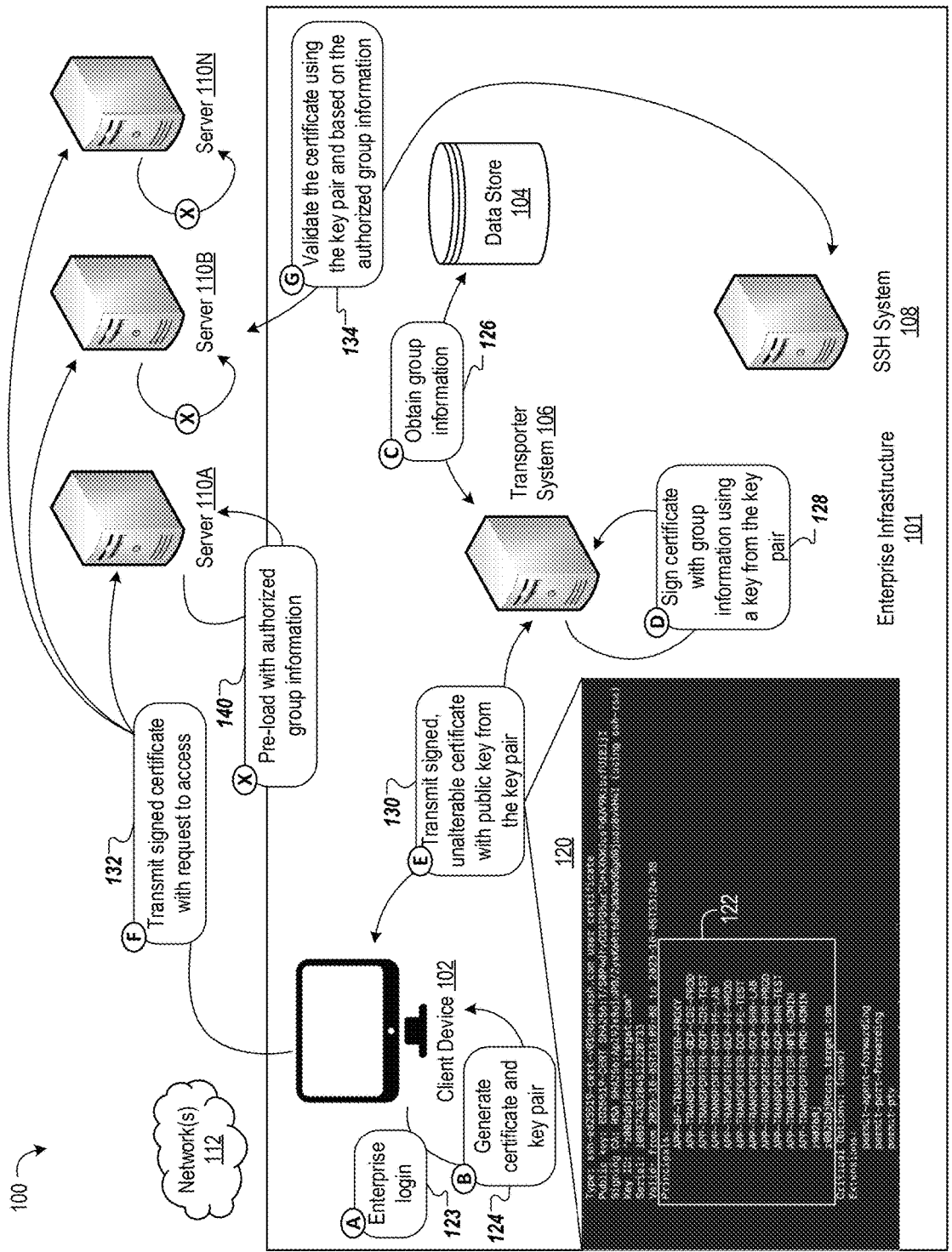
FIG. 1A is a conceptual diagram of a system that grants user access to destination servers by validating user SSH certificates having respective server-access group authorization information.

Referring to the figures, FIG. 1A is a conceptual diagram of a system 100 that grants user access to destination servers 110A-N by validating user SSH certificates 120 having respective server-access group authorization information 122. As described further in reference to at least FIG. 5B, the disclosed technology supports key-based SSH authentication as part of enterprise security patterns. This allows a user at a client device 102 to log into the servers 110A-N with their LAN ID verses using a CO account. In brief, the disclosed technology combines a client-side tool to request/ renew SSH certificates with API technology that issues certificates valid for a predetermined period of time, such as 15 minutes. The certificate 120 can then be used for key-based SSH authentication on the servers 110A-N.

The system 100 can include a client device 102, a transporter system 106, an SSH system 108, the servers 110A-N, and a data store 104, which may communicate (e.g., wired, wirelessly) via network(s) 112. In some implementations, the SSH system 108 can be any other type of secure communication protocol computing system. Any of the components 102, 104, 106, 108, and 110A-N may be part of an enterprise's internal data infrastructure 101 or network. Any of the components 102, 104, 106, 108, and 110A-N may additionally or alternatively be separate from or remote from the enterprise's internal data infrastructure 101 or network. For example, one or more of the servers 110A-N may be destination servers that are non-core segments of the enterprise's internal infrastructure 101. Therefore, the one or more servers 110A-N may be external to the enterprise's infrastructure 101. Sometimes, the one or more servers 110A-N may be untrusted end points or otherwise have unknown trust relationships with other components and devices within the enterprise's infrastructure 101, such as the transporter system 106 and/or the client device 102.

The transporter system 106 can be a microservice deployed within the enterprise infrastructure 101. The transporter system 106 can also be a microservice remote from the enterprise infrastructure 101 that is accessible via the network(s) 112. As described herein, the transporter system 106 can be used to authenticate the user of the client device 102 and essentially transport the user's identity to one or more of the servers 110A-N.

The SSH system 108 can be a certificate authority service and/or an authorization provider. The SSH system 108 can leverage the user's enterprise's IdP identity to determine authorization for that user.

The servers 110A-N can include SSH servers or other types of servers, services, and/or components that may be part of the enterprise infrastructure 101 or external to the infrastructure 101. For example, the servers 110A-N may include one or more destination servers or end points that are non-core segments of the enterprise infrastructure 101. Such servers 110A-N may include cloud servers, such as those that live in cloud platforms, including but not limited to GOOGLE CLOUD PLATFORM (GCP). The servers 110A-N may include servers that live in one or more distributed hybrid cloud data centers that are associated with the enterprise. Sometimes, the servers 110A-N may include secure segments, such as a payment card industry (PCI) and/or a demilitarized zone network (DMZ). Any of the servers 110A-N may also be tunnel servers, as described further in reference to at least FIGS. 4 and 5A. Tunnel servers can serve as end points that check, using certificates, whether the user of the client device 102 is allowed into a particular cloud/external environment and, if so, whether the user is authorized to access a particular destination server within that environment. Refer to FIG. 5B for further discussion about operations performed by a tunnel server.

The data store 104 can be configured to maintain authorized group information. The authorized group information can indicate groups of users that are authorized to access one or more of the servers 110A-N and/or other segments and/or servers associated with the enterprise infrastructure 101. The data store 104 can further be configured to maintain unique identifiers for those groups of users, which may be described herein as authorized principals or key authorized principals. The unique identifiers for the groups, can be arbitrary strings that allow access to a specific host and/or a specific user on a specific host. These arbitrary strings can be added to a user's certificate and validated against authorized group information for a destination server in order to determine whether the user is authorized to access that destination server.

Referring to the system 100 in FIG. 1A, each of the servers 110A-N can be pre-loaded with authorized group information (block X, 140). This information can include the arbitrary strings for the groups that are authorized to access the respective servers 110A-N, as mentioned above. These servers 110A-N (e.g., destination servers and tunnel servers) can therefore be configured to require specific groups to be present in user certificates before access to the respective server can be provided to the user(s). The servers 110A-N can be pre-loaded with the authorized group information at any point before, during, or after operations described herein with reference to FIG. 1A.

Figure 1B:
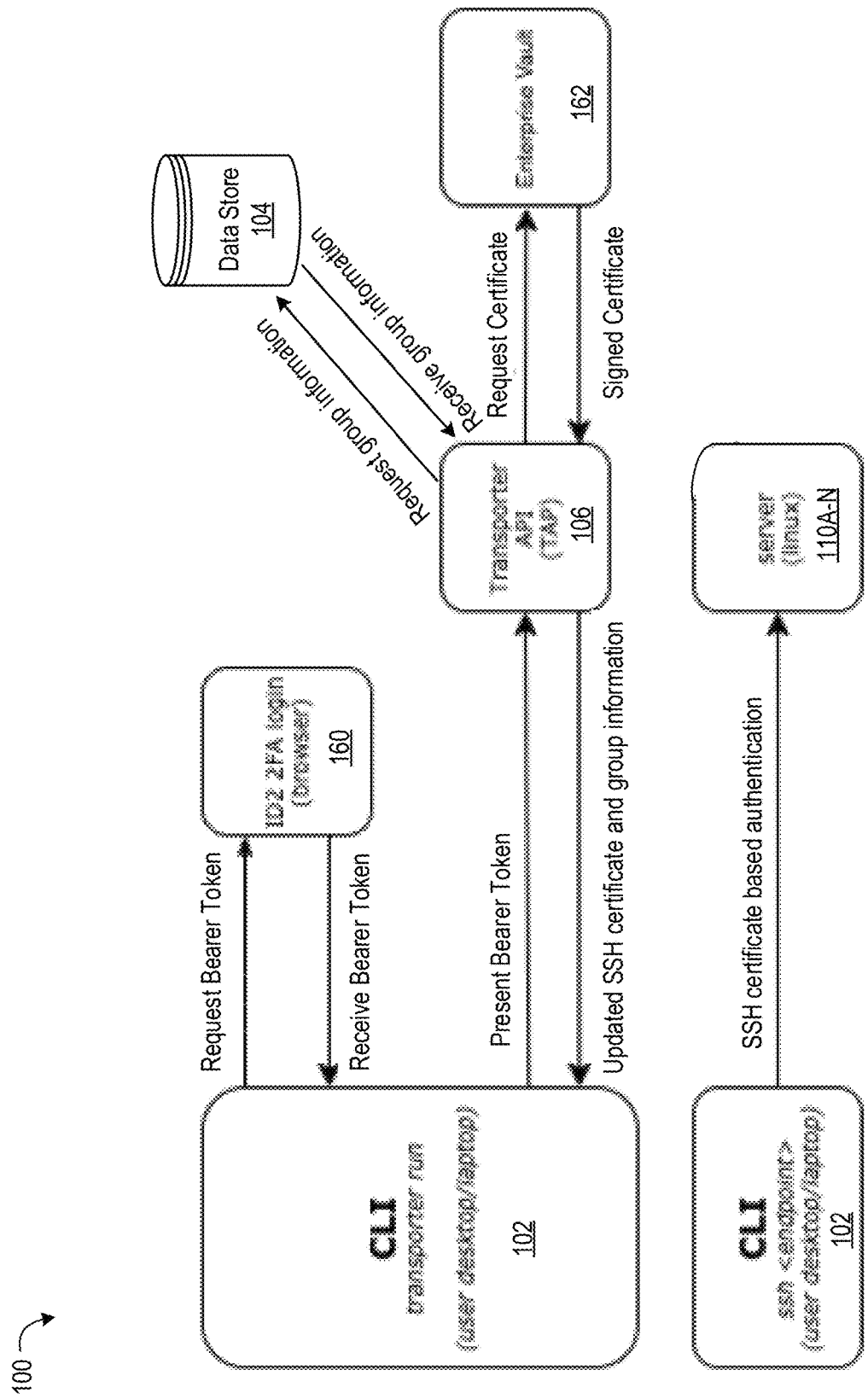
FIG. 1B is a conceptual diagram of a system for using enterprise IdP functionality and server-access group authorization information to grant a user SSH access to one or more destination servers.
Figure 2:
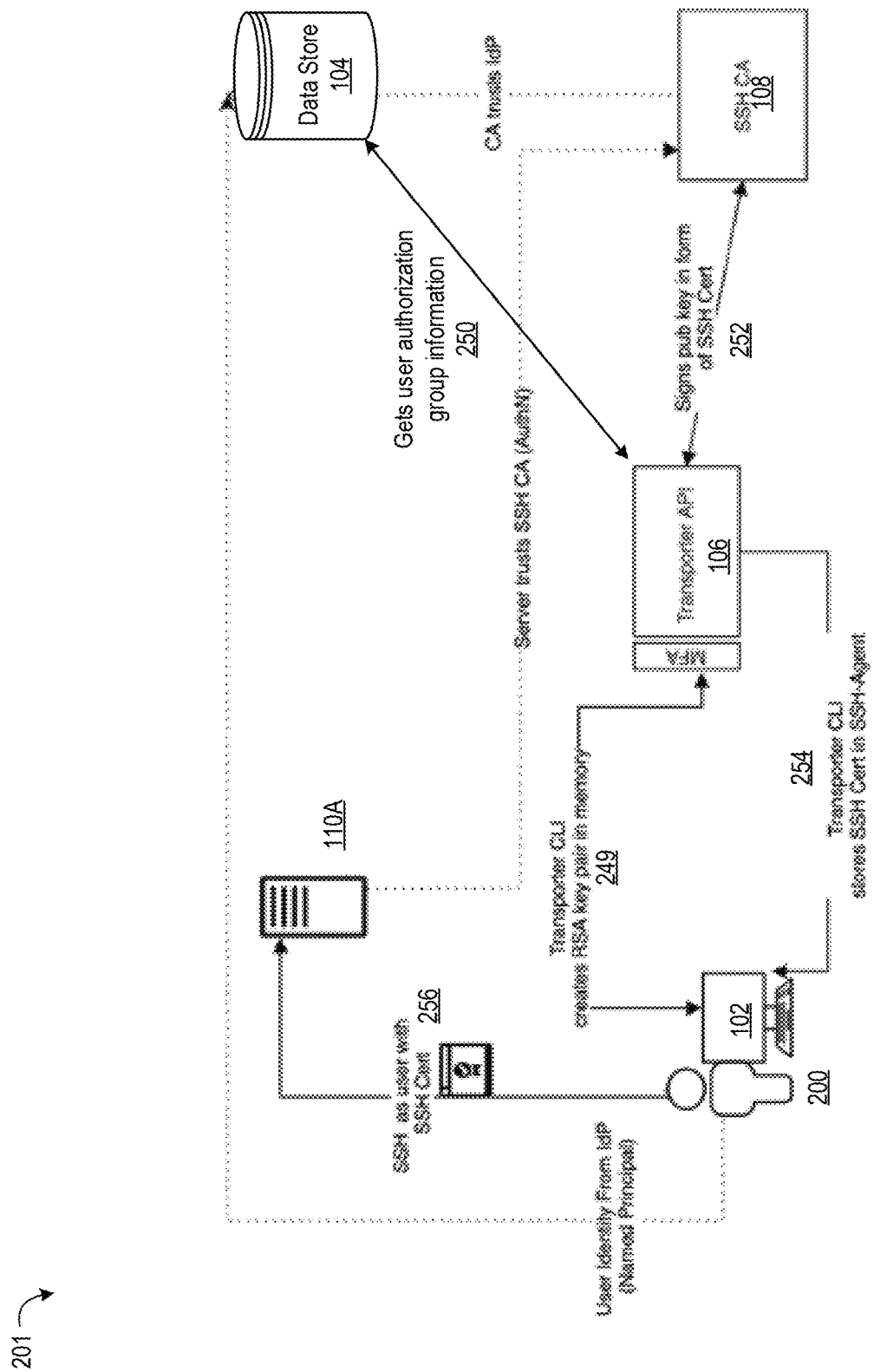
FIG. 2 is a conceptual diagram of a system 201 for authenticating user access to one or more destination servers using an SSH certificate of the user.

The client device 102 can perform an enterprise login process in block A (123). Refer to FIGS. 1B, 2, and 5B for further discussion. Successfully logging into the enterprise can cause a process to begin in which a certificate, such as an SSH certificate, is created for the user of the client device 102. The user's enterprise login information can be provided to the transporter system 102. The client device 102 can generate a certificate and key pair for the user (block B, 124). Thus, the client device 102 can be configured to generate a unique key pair using the user's enterprise login information then send the public key information to the transporter system 106 (e.g., a transporter API as described herein) to be signed.

The certificate can be a digitally-signed public key of the key pair. The transporter system 106 can also communicate with the data store 104 to obtain group information for the user of the client device in block C (126). The transporter system 106 can add the obtained group information to the generated certificate. In other words, the transporter system 106 can stamp the group information in the certificate at time of signing the certificate. The certificate can be issued with a key ID and principals that identify the user to whom the certificate is issued and groups that the user is part of and that will be used for authorization to access the servers 110A-N. Sometimes, the transporter system 106 can determine which groups to include in the certificate by verifying the groups from an authority token and/or by calling an API directly.

Accordingly, the transporter system 106 can sign the certificate with group information using a key from the key pair (block D, 128). The certificate can be signed and authenticated using a LAN ID associated with the user of the client device 102. Signing the certificate can include minting the certificate with an identifier for the user and the authorized groups associated with the user.

The transporter system 106 can transmit a signed, unalterable certificate 120 with a public key from the key pair in block E (130). A private key in the key pay and the signed certificate can be stored in memory of the client device 102 in, for example, an SSH agent (e.g., a process that is run on the client device 102), as described herein. The private key may not be written to a hard disk, other similar storage, or transmitted off of the client device 102. Moreover, the private key can be removed from the memory and/or SSH agent once the certificate automatically expires.

Figure 5B:
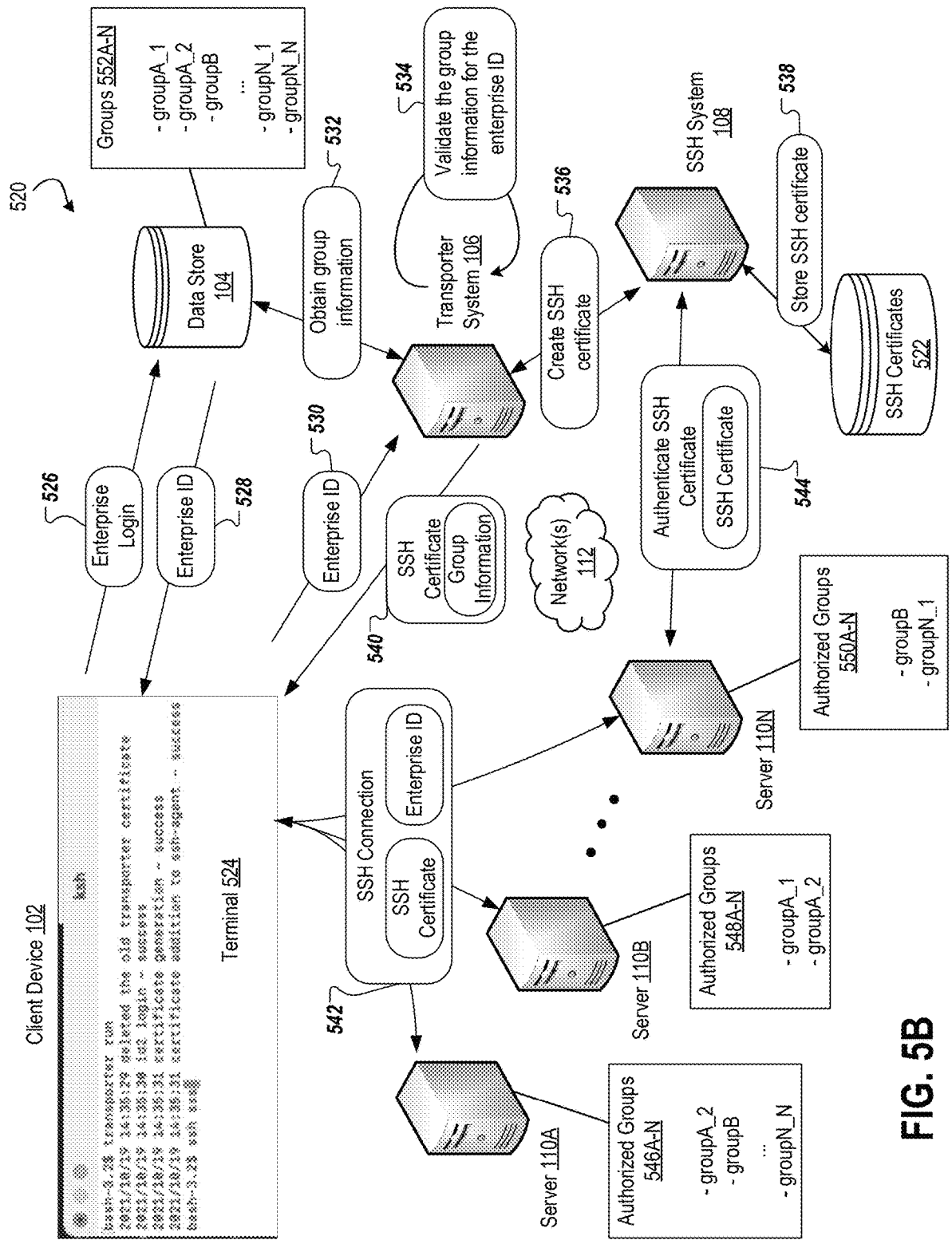
Figure 6:
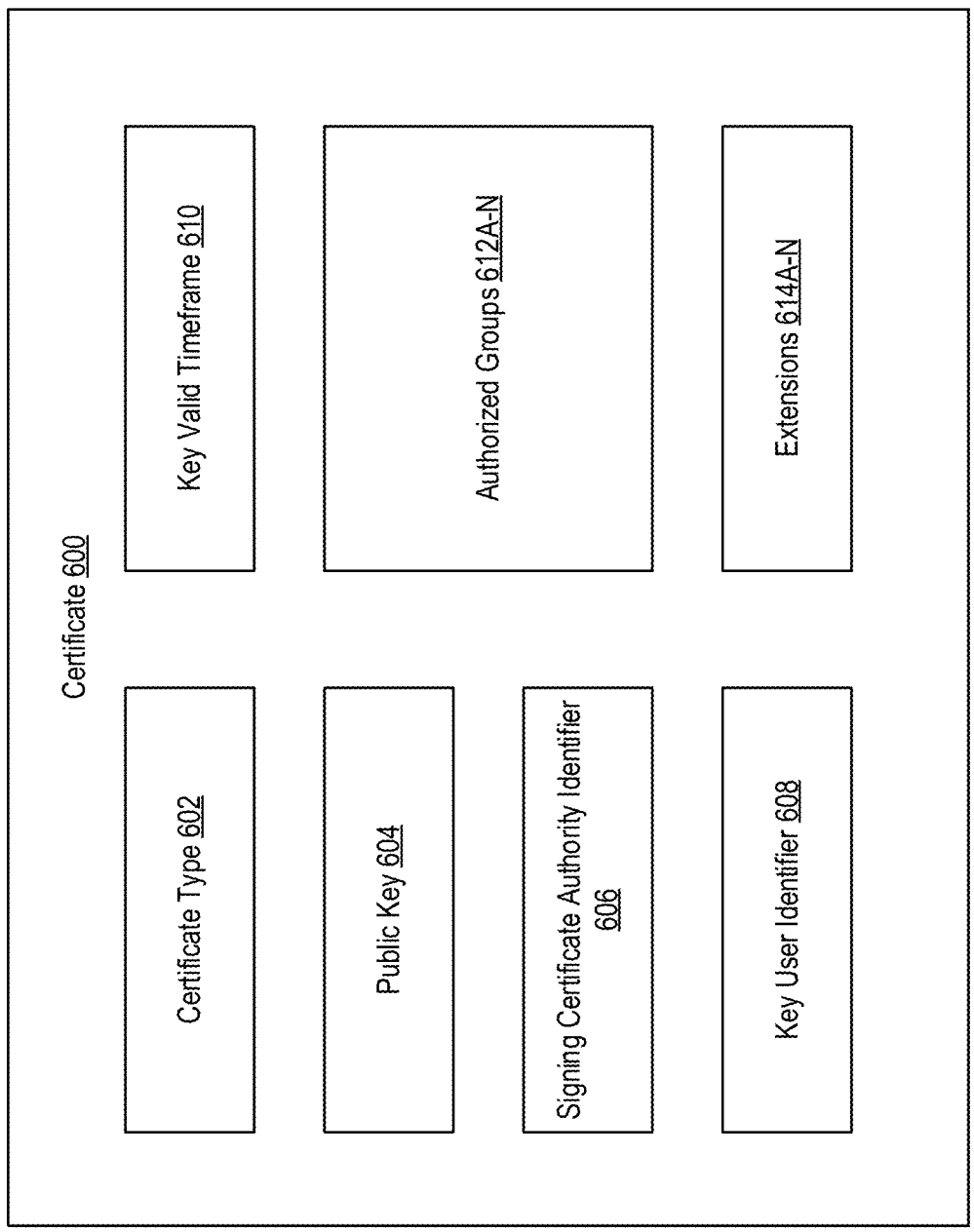
FIG. 6 illustrates an example SSH certificate used with the disclosed technology.

The certificate 120 can include group information 122, indicating which groups the user is part of. A payload of the certificate 120 may not be altered. An entirety of the certificate 120 can be signed (e.g., the certificate 120 can be hashed with a signing value). The certificate 120 can be used for key-based SSH authentication on destination servers, such as the servers 110A-N. In some implementations, certification-based authentication may be used where certificate verification is sufficient/recognized. Refer to FIG. 6 for further discussion about information in the certificate 120. Refer to FIGS. 1B, 2, and 5B for further discussion about generating and signing the certificate in blocks B-D (124-128).

Once the client device 102 receives the signed, unalterable certificate 120, the client device 102 can transmit the signed certificate 120 with a request to access to one or more of the servers 110A-N (block F, 132). As described herein, the request can be transmitted to a tunnel server, which may be one of the servers 110A-N. The tunnel server may check the group information 122 in the certificate 120 against the pre-loaded authorized group information for the tunnel server and/or the other servers 110A-N to determine whether the client device 102 is authorized to access. The servers 110A-N may be configured to trust the certificate from the client device 102.

FIG. 1B is a conceptual diagram of the system 100 for using enterprise IdP functionality (e.g., LAN ID) and server-access group authorization information to grant a user of the client device 102 SSH access or other type of secure communication protocol access to one or more destination servers 110A-N.

The client device 102 can open a terminal (e.g., refer to the terminal 524 in FIG. 5B) and run a transporter tool of the transporter system 106 in the background. The client device 102 can request a bearer token from an IdP login program of an IdP system 160. In other words, a command for running the transporter tool at the client device 102 can trigger an enterprise login interface to be presented at the client device 102 in a web browser. Once the user provides their login credentials at the web browser, the client device 102 can receive the bearer token from the IdP system 160. In some implementations, the user of the client device 102 can be authenticated using multi-factor identity techniques to obtain the bearer token. Refer to FIG. 5B for further discussion. In some implementations, the client device 102 can retrieve the bearer token from the data store 104 instead of receiving the bearer token from the IdP system 160.

The client device 102 can then present the bearer token to the transporter system 106 via the transporter tool running at the client device 102. The transporter system 106 can authenticate the user of the client device 102 based on the bearer token (e.g., validate whether the token is valid and for whom the token was minted). Once successfully authenticated, the transporter system 106 can request an SSH certificate or other type of secure communication for the user's identity, via a transporter API, from an enterprise vault 162. The enterprise vault 162 can be, in some implementations, the SSH system 108 described in at least FIG. 1A. The enterprise vault 162 can be a certificate issuer. In some implementations, the enterprise vault 162 can be a data store associated with the enterprise, such as the data store 104. The data store, for example, may already have SSH certificates associated with the user's identity and the transporter system 106 can retrieve the SSH certificate corresponding to the user's identity.

Still referring to FIG. 1B, the transporter system 106 can receive the signed SSH certificate from the enterprise vault 162.

The transporter system 106 may also request group information from the data store 104 for the user of the client device 102. The transporter system 106 can use an API and the bearer token to communicate with the data store 104 and request the group information associated with the user of the client device 102. Sometimes, the API can pull tokens and group information out of the bearer token, since the token may have group identifiers therein. However, when the bearer token does not have group identifiers therein, the transporter system 106 can request the group information from the data store 104 and using the API. The transporter system 106 can receive all group authorization information that may be relevant to the user associated with the token and the client device 102. The transporter system 106 can receive the group information then add that information to the certificate. Once the certificate is updated to include the group information, the transporter system 106 can add the updated signed certificate and group information to an SSH agent daemon (or other local agent) at the client device 102.

In some implementations, after validating the user at the client device 102 using the bearer token, the transporter system 106 can request and receive the group information for the user from the data store 104 and provide that information with a request for a certificate to the enterprise vault 162. The enterprise vault 162 may then mint the certificate. The enterprise vault 162 can build the certificate and incorporate the group information therein. Sometimes, the enterprise vault 162 may perform one or more checks to determine which of authorized groups in the group information are most relevant to include with the user's certificate. The enterprise vault 162 may then return a signed, unalterable certificate to the transporter system 106, which transmits the certificate back to the client device 102. The client device 102 can then use the certificate to access any server that is within the enterprise data infrastructure and/or any server that is external to the enterprise data infrastructure, such as part of an external cloud environment.

The certificate can be valid for a predetermined period of time, which can be defined and unalterable in a payload of the certificate. The predetermined period of time can be approximately 15 minutes, in some implementations (e.g., a time to live, TTL). The client device 102 can then provide the signed SSH certificate and group information to one or more of the servers 110A-N for SSH certificate-based authentication and access. As a result, the client device 102 can communicate with availability zones and segments outside of an enterprise's data infrastructure. One or more of the servers 110A-N may act as a tunnel server or intermediary server (e.g., a firewall proxy) to perform authorization checks using the SSH certificate from the client device 102. The tunnel server can assess the certificate, which is created with authorization attributes built therein, to determine whether the user at the client device 102 is authorized to access the servers 110A-N without calling to other servers, data stores, and/or systems. Authorization to access the servers 110A-N can be determined using cascading levels of group authorizations checks. In some implementations, only the server acting as the tunnel server may be required to be PCI control-compliant rather than requiring all the servers 110A-N to be PCI control-compliant.

FIG. 2 is a conceptual diagram of a system 201 for authenticating user access to one or more destination servers 110A using an SSH certificate 256 of a user 200 of the client device 102. Here, trust can be established between the transporter system 106, the SSH system 108, and the data store 104. As described herein, the transporter system 106 can be used to authenticate the user 200, generate a trusted SSH certificate 256 for the user 200 based on their enterprise login, and provide that SSH certificate 256 back to the client device 102 to be used to authenticate the user 200 and get access to destination servers such as the server 110A. The transporter system 106 can leverage the trust that was established between the transporter system 106, the SSH system 108, and the data store 104.

The client device 102 can initiate a login process as described herein. In response to this initiation, the transporter system 106 can create an RSA key pair in memory for the user 200 of the client device 102 (249).

The transporter system 106 can use that key pair or other user-identifying information (e.g., a token, as described in reference to FIG. 1B) to get user group authorization information from the data store 104 (250).

The transporter system 106 can provide the group authorization information and a key from the key pair to the SSH system 108 (252). The transporter system 106 can receive back a signed key from the SSH system 108 that serves as an SSH certificate, as described throughout this disclosure (252).

The transporter system 106 can transmit the SSH certificate to the client device 102 of the user 200 (254). The SSH certificate can reside in memory at the client device 102 (254). For example, the SSH certificate can be stored in an SSH agent or other local agent at the client device 102.

The client device 102 can then perform SSH authorization with the server 110A using the SSH certificate 256 (256). The server 110A can be a tunnel server, as described herein and in particular in reference to FIGS. 4 and 5A. The server 110A can also be populated with group information so that the server 110A can appropriately validate the SSH certificate 256 and determine whether the user 200 has authorized access as part of a group that is authorized to access the server 110A or one or more other external destination servers.

As an illustrative example, the server 110A can include a cloud-based environment that can be populated or otherwise configured with group authorization information indicating which groups of users can access that environment. The cloud-based environment can be spun up at the server 110A whenever the user 200 creates or established their identity (e.g., login credentials) information with the cloud-based environment. That identity information may be used by the server 110A to establish what group(s) the user 200 is part of and whether that group is authorized to access the cloud-based environment. In other words, if the user creates login credentials with a cloud-based environment that is spun up at the server 110A, the user may become a member of an authorized group that can access the cloud-based environment. When the user tries to access the cloud-based environment at another time using their certificate 256, the server 110A can check group authorization information in the certificate 256 against pre-loaded group information associated with the cloud-based environment to validate the certificate 256 and grant the user 200 access to the cloud-based environment.

Figure 3A:
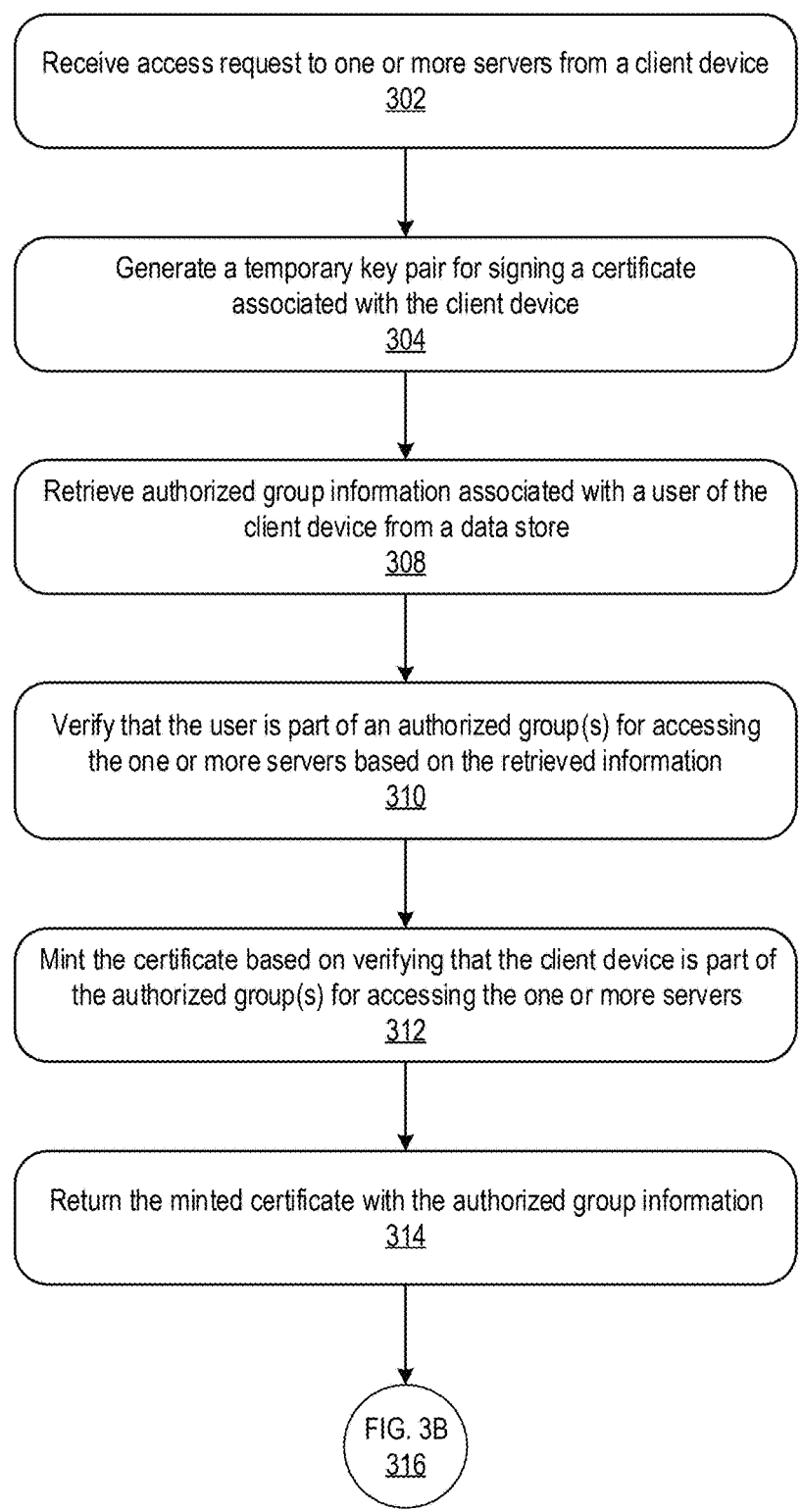
FIGS. 3A and 3B are a flowchart of a process for granting user access to destination servers and establishing an SSH tunnel to the destination servers using SSH certificates having server-access group authorization information.
Figure 3B:
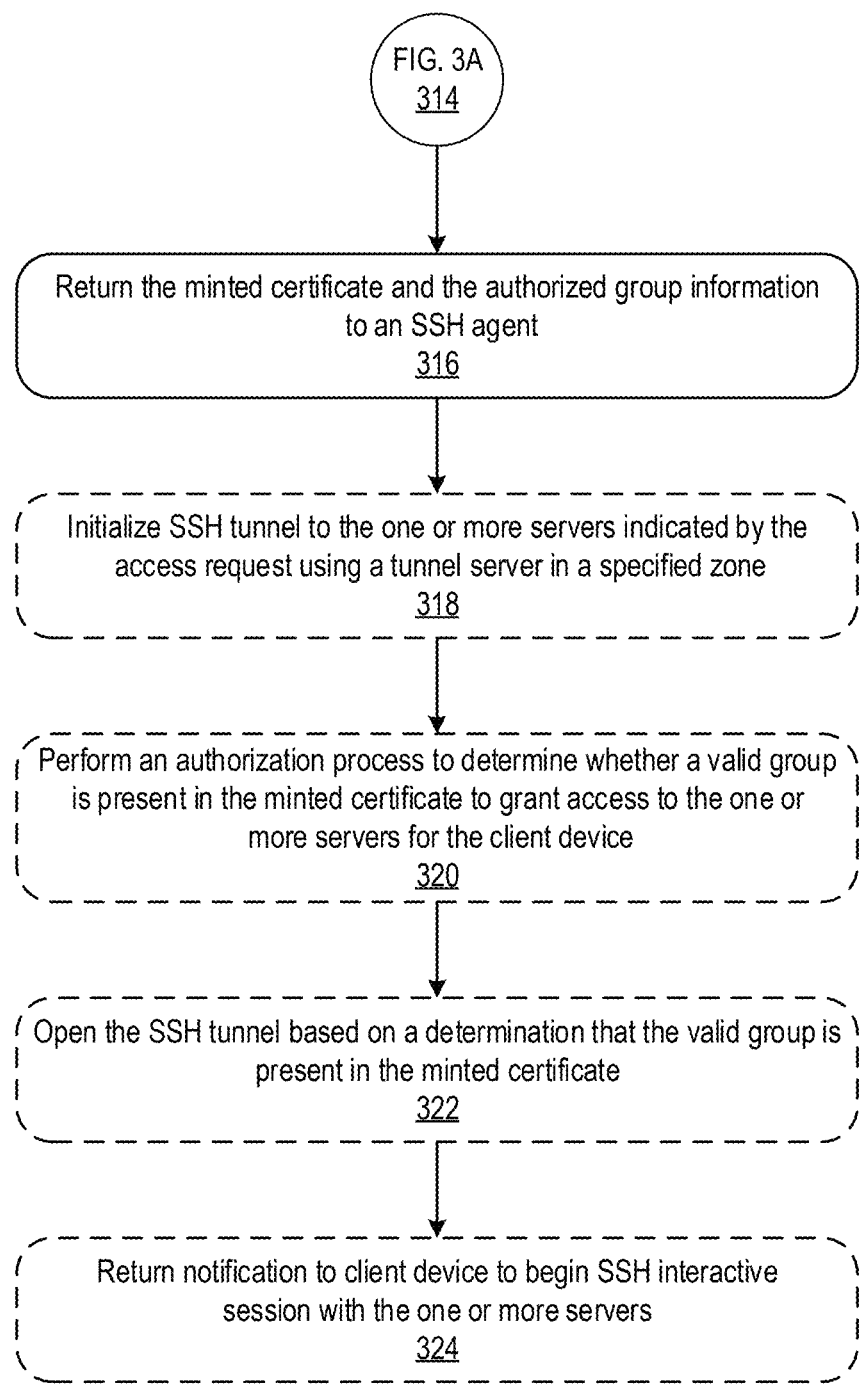

FIGS. 3A and 3B are a flowchart of a process 300 for granting user access to destination servers and establishing an SSH tunnel (e.g., using an SSH tunnel proxy) or other type of secure communications tunnel or bridge to the destination servers using SSH certificates having server-access group authorization information. A computer system, such as the transporter system 106, can generate a key pair for use in generating an SSH certificate or other similar certificate for a user at a client device. The computer system can also provide a legacy option of using an RSA key pair for user certificate generation. The RSA key pair can be an algorithm that is used to generate an SSH key pair described herein. Thus, an RSA SSH key pair can be generated and used with the disclosed techniques. Sometimes, an elliptic curve cryptographic certificate (e.g., ed25519) can be generated and used with the disclosed techniques instead of the RSA SSH key pair. SSL/TLS certificates that use elliptic curve cryptography (ECC) instead of the RSA algorithm can be used to securely encrypt data transferred between a user and another system. One or more other key pair generation techniques and types of key pairs may also be used with the disclosed techniques. The computer system can also add port forwarding to an enterprise policy, which can be applied to the certificate once generated.

The process 300 can be performed by the transporter system 106. In some implementations, one or more blocks in the process 300 can be performed by other computing systems described herein, such as the SSH system 108, the data store 104, and/or the enterprise vault 162. In some implementations, one or more blocks in the process 300 can be performed by one or more other systems, computers, and/or devices. For illustrative purposes, the process 300 is described from the perspective of a computer system.

Referring to the process 300 in FIGS. 3A and 3B, the computer system can receive an access request to one or more servers from a client device (block 302). The servers can include destination servers that are external an enterprise's data infrastructure/network. The servers can include servers that are internal the enterprise's data infrastructure/network. For illustrative purposes, the process 300 is described from the perspective of requesting access to the external destination servers. The request can be received as part of a user of the client device logging into the enterprise infrastructure using enterprise login information. The request can be received after the user of the client device has successfully logged into the enterprise infrastructure. Refer to at least FIG. 5B for further discussion about logging into the enterprise infrastructure.

In response to receiving the access request, the computer system can generate a temporary key pair for signing a certificate associated with the client device (block 304). The key pair can include a public key and a private key. The key pair can be generated using an elliptic curve cryptographic certificate (ed25519) algorithm. The key pair can additionally or alternatively be generating using an RSA key pair algorithm. The key pair, as described herein, can be stored in an SSH agent, which is a separate process on the client device.

The computer system can retrieve authorized group information associated with the user from a data store, such as the data store 104 described herein, to be added to the certificate associated with the client device (block 308). The certificate can include identifiable information about the user, including but not limited to their name, enterprise login information, unique identifier, etc. The certificate can also be populated with the group information from an active directory (e.g., the data store 104), which would be used to grant access to one or more systems. As an illustrative example, the access request received in block 302 can include a token (e.g., bearer token). The token can indicate particular groups and/or group identifiers that the user is associated with and that are relevant for the one or more servers that the user is requesting to access. Using the token, the computer system can retrieve the group information that corresponds to the groups/group identifiers provided by the token. The user may be associated with a plurality of groups that have access to a plurality of servers. However, the particular access request may be for a particular server amongst the plurality of servers that the user can access. The token can indicate the particular server and a group identifier for that server. The computer system can then use that group identifier to retrieve only the authorized group information linked to that group identifier for the particular group that can access the requested particular server (rather than group information for all groups the user is part of for the plurality of servers).

The computer system can verify, in block 310, that the user is part of an authorized group or groups for accessing the one or more servers based on the retrieved information. The computer system can, for example, compare a unique identifier for the user against other unique user identifiers in the retrieved information to identify whether the user's unique identifier appears in the information. If the user's unique identifier appears in the retrieved information, then the user is part of the group that is authorized to access the one or more servers in the access request.

In block 312, the computer system can mint the certificate based on verifying that the client device is part of the authorized group(s) for accessing the one or more servers. Minting the certificate can include signing the certificate. Sometimes, minting the certificate may also include creating the certificate for the user using the key pair.

The computer system can leverage an API to add identifiers for the authorized group information to the certificate. A policy of the certificate can be configured and enabled with port-forwarding techniques. The computer system can implement multiple hashicorp policies, such as one for core segments/servers of the enterprise data infrastructure and one for non-core segments, that include permit port forwarding. The API can also be used to decide which policy to call based on presence of a tunnel authorization group in the certificate. Sometimes, any tunnel authorization group can result in a certificate with permit port forwarding. If port forwarding is permitted, then the computer system can include an extension in the certificate during minting. Example groups "App-Tunnelserver-gcp" and "App-Transporter_Tunnelserver-secure" can result in generating a certificate with permit port forwarding.

Then, the computer system can return the minted certificate with the authorized group information in block 314. Refer to FIG. 6 for further discussion about contents of the minted certificate.

In block 316, the computer system can return the minted certificate and the authorized group information to an SSH agent or other type of secure communication protocol agent. The SSH agent can be at or otherwise part of the client device. The client device can then use the certificate to obtain access to the one or more servers in the access request. As described further in reference to FIGS. 4 and 5A, the client device may pass the certificate and access request to a tunnel server, which may or may not be one of the servers in the access request. The tunnel server can validate the certificate (e.g., using a public key from the key pair) and check that the user is part of an authorized group to access the one or more servers in the access request. If the user is part of the authorized group, the tunnel server can grant access of the user to the one or more servers in the access request. Granting the access includes establishing an SSH tunnel between the client device and the one or more servers. Granting the access includes establishing an interactive SSH session via the tunnel for the client device.

As described throughout this disclosure, the user of the client device is required to be part of at least a first authorized group to access the tunnel server and at least a second authorized group to access one or more destination servers. The first authorized group can provide access to the user by opening up a port forwarded (e.g., tunnel) connection into a specified zone and/or segment. The second authorized group can provide the user with access to a particular destination server. If the user is missing either of the first or second authorized groups, then they are deemed not authorized to access the particular resource (e.g., specified zone and/or segment). The computer system can make this determination and return a notification indicating that the user's permission to access is denied. To remedy a permission denied scenario, the user may request to be added to the group that provides access to the intended server and/or resource.

Optionally, the computer system may initialize an SSH tunnel to the one or more servers indicated by the access request using a tunnel server in a specified zone (block 318). The specified zone can be a specific network segment or cloud environment. The specified zone can include, but is not limited to, non-core segments or zones such as GCP, PCI segments, DMZ segments, etc. In some implementations, the tunnel may be initialized by one or more other components, such as the client device and/or the tunnel server.

Additionally or alternatively, the computer system may optionally perform an authorization process to determine whether a valid group is present in the minted certificate to grant access to the one or more servers for the client device (block 320). Sometimes, the block 320 may be performed by the client device and/or the tunnel server.

Additionally or alternatively, the computer system may optionally open the SSH tunnel based on a determination that the valid group is presented in the minted certificate (block 322). Sometimes, block 322 can be performed by the tunnel server.

Additionally or alternatively, the computer system may optionally return a notification to the client device to begin an SSH interactive session with the one or more servers (block 324). Sometimes, block 324 can be performed by the tunnel server and/or the one or more servers in the access request.

Figure 4:
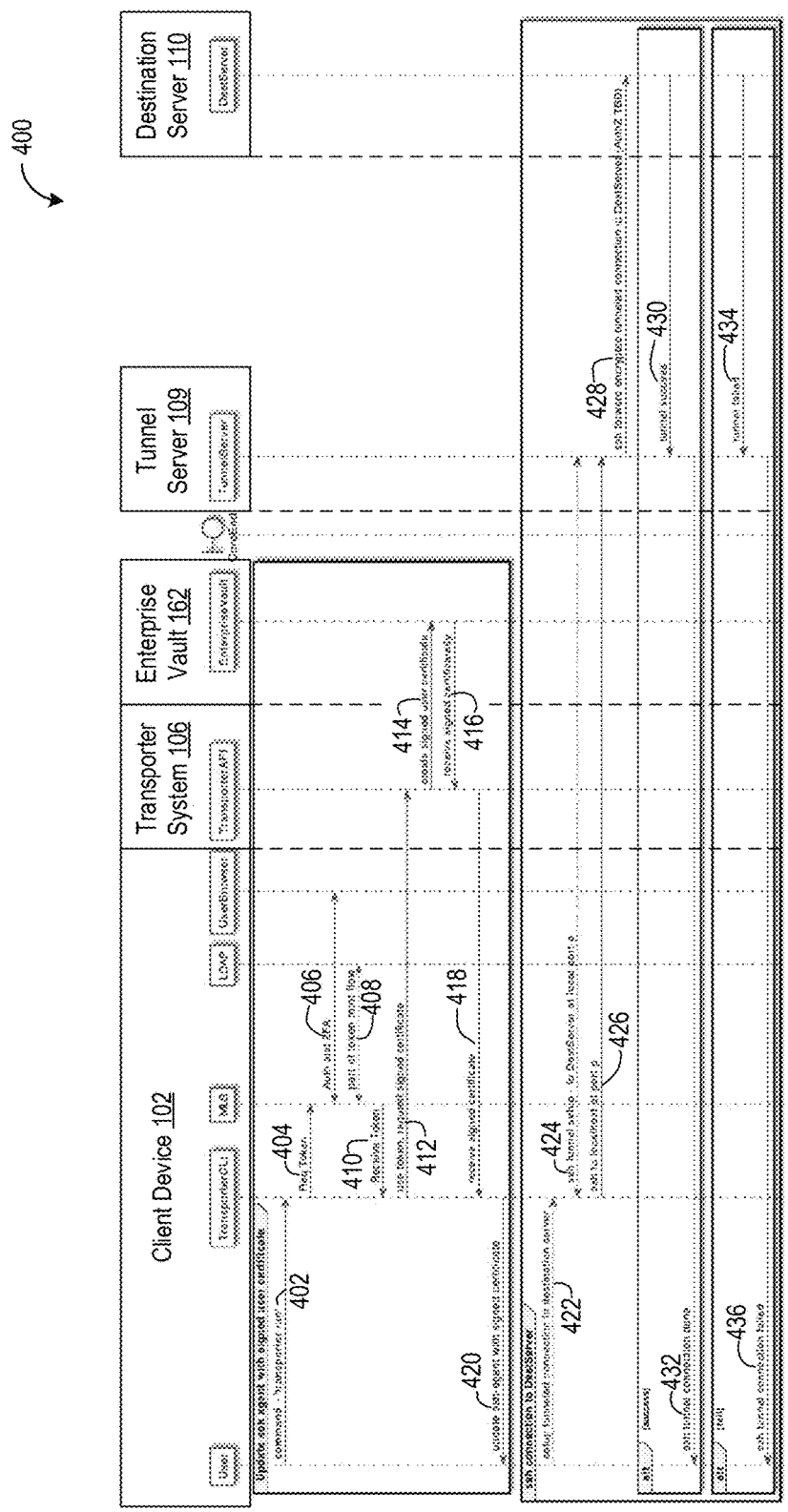
FIG. 4 is a swimlane diagram of a process for establishing an SSH tunnel between a user client device and a destination server.
Figure 5A:
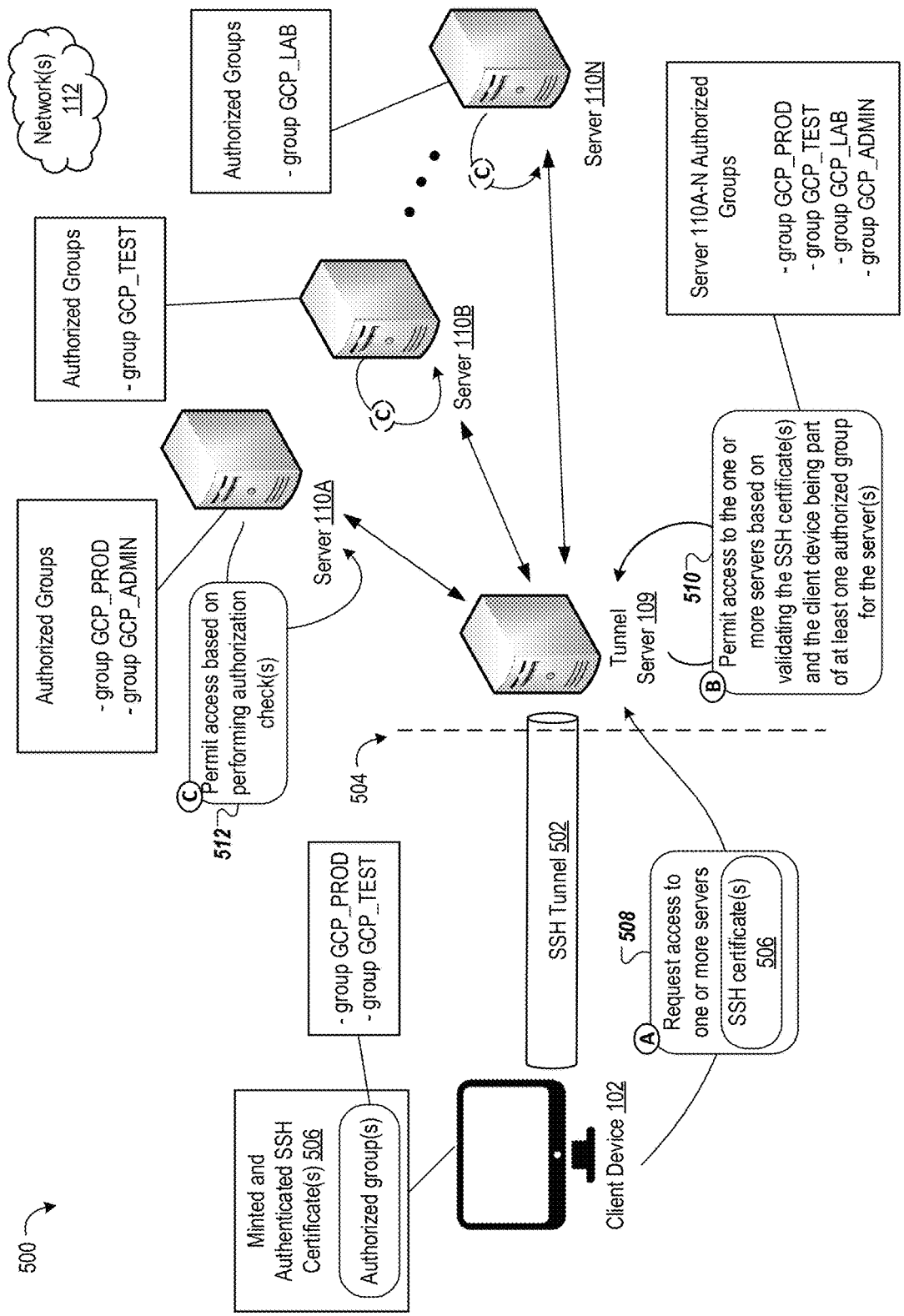
FIGS. 5A and 5B are conceptual diagrams of systems for establishing an SSH tunnel between a user client device and destination servers based on validating a user SSH certificate having server-access group authorization information.

Refer to FIGS. 4 and 5A for further discussion about performing blocks 318-324.

FIG. 4 is a swimlane diagram of a process 400 for establishing an SSH tunnel or other type of secure communication protocol/tunnel between the user client device 102 and the destination server 110. For illustrative purposes, the process 400 is described from the perspective of establishing an SSH tunnel. The process 400 is shown in FIG. 4 as being performed by the client device 102, the transporter system 106, the enterprise vault 162, a tunnel server 109, and the destination server 110. One or more blocks in the process 400 may be performed by one or more other computers, systems, devices, modules, and/or programs.

Referring to the process 400, blocks 402-420 can be performed to update an SSH agent with a signed user certificate. Blocks 422-436 can be performed to establish an SSH connection between the client device 102 and the destination server 110. The process 400 illustrates that there may be no connectivity of the end point destination server 110 and the client device 102. Therefore, the disclosed techniques can be performed without having to trust the destination server 110.

A user at the client device 102 can provide a command to run the disclosed techniques (e.g., run transporter) in 402. A transporter CLI (e.g., an interface presented at the client device 102 in response to executing the command) can be configured to request a token for the user (404). The user at the client device 102 can provide user input to a single sign-on platform and/or logon page presented at the client device 102. The user input can be used to provide initial authentication for the user. The client device 102 can authenticate and perform two factor authentication (2FA) (406), which can be part of a token minting process at the client device 102 (408). The token can then be received at the transporter CLI (410) and used by the transporter CLI of the client device 102 to request a signed certificate from the transporter system 106 (412). The user's LAN ID credentials can be used to authenticate the request and sign the certificate. The transporter CLI may transmit a public key in a key pair for signing the certificate to the transporter system 106.

The transporter system 106 may communicate with the enterprise vault 162 to create and receive a signed, unalterable certificate for the user (414-416). As part of creating and signing the certificate, the transporter system 106 can use an API to retrieve authorized group information for the user. The retrieved information can be added to the certificate. Refer to FIG. 1B for further discussion. The transporter system 106 can provide the signed certificate with the authorized group information to the transporter CLI of the client device 102 (418), and the transporter CLI can update an SSH agent with the signed certificate (420).

In 422, the user at the client device 102 can provide user input to set up a tunneled connection to the destination server 110. The user input can be provided to the transporter CLI at the client device 102. The transporter CLI at the client device 102 can then communicate with the tunnel server 109 to set up an SSH tunnel to the destination server 110 at a local port p (424). The transporter CLI at the client device 102 can additionally or alternatively establish SSH to a local host at the local port p with the tunnel server 109 by creating a configured listening socket on the local host (426). The tunnel server 109 can authenticate the user of the client device 102 using the certificate issued by the transporter API of the transporter system 106. The certificate can be provided in the SSH tunnel setup in 424. In some implementations, the tunnel setup can be part of the transporter CLI run command (402).

The tunnel server 109 can attempt establishing an SSH forward encrypted tunneled connection to the destination server 110 (428) based on checking and validating the user's certificate and the authorized group information. Thus, the SSH certificate can be checked and validated at the point of establishing the tunnel. To authenticate the certificate, an SSHD service of the tunnel server 109 can validate a signature of the certificate against a pre-installed Transporter public key and also ensure that the certificate is still within its validity period (e.g., 15 minute TTL since certificate creation/signing/minting). The tunnel server 109 can establish the tunneled connection based on determining whether a valid authorized group for using a tunnel connection to the destination server 110 is present in the certificate. The tunnel server 109 therefore can be checking the certificate for a generic group that permits access to a zone that includes the destination server 110. The destination server 110, as described further below, may check the certificate for a specific group that permits access to the destination server 110 itself.

If the tunnel connection is a success (e.g., the certificate is checked and validated, and the valid group(s) is in the certificate), a response indicating the success can be transmitted to the tunnel server 109 from the destination server 110 (430), and a notification that the SSH tunnel connection is completed can be transmitted from the tunnel server 109 to the client device 102 (432). The CLI of the client device 102 can open an SSH connection to the destination server 110 using the tunnel. Once the connection is established, the destination server 110 may evaluate whether a valid authorized group authorized for accessing the destination server 110 is present in the certificate. If so, then the CLI of the client device 102 may be permitted to begin an interactive SSH session with the destination server 110. The user can then interact with the destination server 110 through the tunnel connection. Since the tunnel is like a VPN connection between the client device 102 and the destination server 110, there may be no additional risk of key compromise as compared to SSH agent forwarding techniques.

If, in 428, the tunnel connection fails (e.g., the certificate cannot be validated by the tunnel server 109), then a notification of the failure can be transmitted from the destination server 110 to the tunnel server 109 (434). A notification that the connection failed can also be transmitted from the tunnel server 109 to the client device 102. As a result, the user may not interact with the destination server 110 because no SSH tunnel connection has been successfully established.

FIGS. 5A and 5B are conceptual diagrams of systems for establishing an SSH tunnel (or other type of secure communications protocol bridge/tunnel) between a user client device and destination servers based on validating a user SSH certificate having server-access group authorization information.

FIG. 5A illustrates a system 500 for establishing an SSH tunnel 502 between a client device 102 and one or more destination servers 110A-N via a tunnel server 109 (e.g., firewall proxy). The client device 102 can communicate via the network(s) 112 with the tunnel server 109. The tunnel server 109 can act similarly to a firewall 504 or another type of SSH server/proxy. The tunnel server 109 can be a gatekeeper to the destination servers 110A-N. In some implementations, the tunnel server 109 may be one or more of the destination servers 110A-N. The tunnel server 109 can be an entry point to the servers 110A-N having one or more firewall rules or similar types of rules for execution. In some implementations, tunnel servers can be deployed as a cluster. The tunnel server(s) can be set behind a load balancer to reduce impact of one or more down servers.

In some implementations, core segments/servers/devices of an enterprise's infrastructure can communicate with the tunnel server 109, but may not communicate with any of the servers 110A-N. Sometimes, each level of access can perform authentication techniques to validate that a user of the client device 102 is authorized to access that level (e.g., a particular destination server). For example, a first hop can be from the client device 102 to the tunnel server 109. In this first hop, the client device 102 can get authenticated and validated to enter a computing environment having the servers 110A-N, such as a cloud-based environment (see block B, 510). The tunnel server 109 can then send the client device 102's certificate to one or more of the requested destination servers 110A-N in a second hop, where the client device 102 can be validated to enter the particular requested destination servers 110A-N (see block C, 512). Regardless of how many and which of the destination servers 110A-N the client device 102 requests access to, the client device 102 must first pass the authentication and validation performed by the tunnel server 109. Both the tunnel server 109 and each of the destination servers 110A-N may perform their own authorization checks.

Both the tunnel server 109 and the destination servers 110A-N may check whether the client device 102's certificate is signed by a correct/appropriate authority. For example, the tunnel server 109 may use the authorization groups in the certificate to evaluate if the user of the client device 102 has generic access to a specified zone to open a tunnel. An illustrative example of an authorized principal checked by the tunnel server would be APP-TRANS-PORTER-GCP-CDE-TEST, which would enable the user to open a tunnel into the GCP-CDE-TEST segment. The destination servers 110A-N may check the same authorization groups in the certificate for specific groups to determine if the user is allowed to access a particular system via SSH. An illustrative example of an authorized principal checked by the destination servers 110A-N would be APP-TRANS-PORTER-ATP-ADMIN. The APP-TRANSPORTER-ATP-ADMIN group would only include members of an ATP team while APP-TRANSPORTER-GCP-CDE-TEST would include anyone who is granted access into the GCP-CDE-TEST segment.

The client device 102 can maintain a minted and authenticated SSH certificate 506. Refer to at least FIGS. 1B and 2 for further discussion about minting and authenticating the certificate 506. The certificate may include one or more authorized group information, which may indicate groups of which a user of the client device 102 is a member. In this illustrative example, the certificate 506 has been minted with 2 authorized groups: group GCP_PROD and group GCP_TEST. The groups, as described herein, can provide or otherwise give access to members of the group to particular services, servers, and/or segments. The services, servers, and/or segments can be part of an enterprise's data infrastructure/network and/or external the enterprise's data infrastructure. For illustrative purposes of FIG. 5A, the servers 110A-N are non-core segments of the enterprise's data infrastructure and may be external to that infrastructure.

The system 500 of FIG. 5A also shows that each of the servers 110A-N has been pre-loaded with respective authorized group information (e.g., group credentials, identifiers). Here, the server 110A is set up to allow members of group GCP_PROD and group GCP_ADMIN to access. The server 110B is set up to allow members of group GCP_TEST to access. The server 110N is set up to allow members of group GCP_LAB to access. One or more additional, fewer, or other groups may be authorized to access one or more of the servers 110A-N. The tunnel server 109 may also be pre-loaded with the authorized group information for all the servers 110A-N. Here, the tunnel server 109 is pre-loaded with the following group credentials: group GCP_PROD, group GCP_TEST, group GCP_LAB, and group GCP_ADMIN.

In some implementations, the tunnel server 109 can service a group or subset of the servers 110A-N that are part of a particular cloud-based environment. Another tunnel server can service another group or subset of the servers 110A-N that are part of another cloud-based environment. Sometimes, the same tunnel server can service multiple different groups of the servers 110A-N, each of the groups being part of a different cloud-based environment or other external network/infrastructure/environment. The group credentials can indicate what group or subset the servers 110A-N are part of. In the illustrative example of FIG. 5A, "GCP" appearing in the group credentials can indicate that any server having "GCP" in its authorized group credentials is part of a GCP environment or segment. Another illustrative example is an authorized principal APP-TRANS-PORTER-GCP-CDE-TEST. This group provides generic access to open a tunnel to a CDE-TEST environment of a GOOGLE CLOUD PLATFORM (GCP).

The client device 102 can request access to one or more of the servers 110A-N in block A (508). The request can include the minted, authenticated, and signed certificate 506. The request can be transmitted to the tunnel server 109. The SSH tunnel 502 can be initialized using a command-line program at the client device 102, as described herein (refer to FIGS. 1A, 1B, and 5B). The tunnel connection can be utilized by SSH'ing to a port on a tunnel port local host. SSH port forwarding, or SSH tunneling, can provide a method for transporting arbitrary data over an encrypted SSH connection. To create the SSH tunnel 502, the client device 102 can first negotiate a session between the tunnel server 109 (e.g., an intermediary proxy server) that will forward to the one or more downstream destination servers 110A-N. As mentioned above, the client device 102 can make an SSH connection on a local port of the tunnel 502, which is then forwarded to the requested destination server 110A-N in an alternate network segment by the tunnel server 109. The SSH tunnel connection, once established, can be encrypted, with a VPN-like connection through the SSH tunnel server 109 to the destination server(s) 110A-N.

The tunnel server 109 can permit access to the one or more requested destination servers 110A-N based on validating the certificate 506 (block B, 510). The certificate 506 only need be validated/authenticated between the client device 102 and the firewall proxy, the tunnel server 109. The group access permissions extend pas the tunnel server 109 to the one or more destination servers 110A-N. Validating the certificate 506 can include checking whether the certificate 506 contains group credentials that match one or more of the authorized groups associated with the requested downstream destination servers 110A-N. In some implementations, the tunnel server 109 may require the user of the client device 102 to be part of the genus group GCP (which represents a particular cloud-based environment). Then, the individual destination servers 110A-N beyond the illustrative firewall 504 would require specific sub-groups within the genus group GCP (e.g., cascading group hierarchy). Here, the certificate 506 contains group credentials for group GCP_PROD and group GCP_TEST. The tunnel server 109 may determine in block B (510) that the client device 102 is authorized to access the server 110A and the server 110B, but not the server 110N (after all, the server 110N only permits access from members of the group GCP_LAB).

Once the tunnel server 109 permits access to one or more of the requested servers 110A-N in block B, 510, each of the requested servers 110A-N can permit access based on performing respective authorization checks of the client device 102's certificate 506 (block C, 512). For example, each of the requested servers 110A-N can determine whether the certificate 506 contains group credentials that correspond to authorized groups for that server.

If the access request from the client device 102 (block A, 508) only requested access to the servers 110A and 110B, the SSH connection or other type of secure communications connection can be established and the client device 102 can begin an interactive, secure SSH session with the servers 110A and 110B. If, on the other hand, the access request from the client device 102 also requested access to the server 110N, the tunnel server 109 may return a notification to the client device 102 that connection with the server 110N failed/was not granted. Sometimes, the SSH tunnel 502 may still be established and used by the client device 102 to interact with the servers 110A and 110B, but the client device 102 would not be permitted to interact with the server 110N. Sometimes, if the connection with one server fails, the tunnel 502 may close and the client device 102 may not be authorized to interact with any of the servers 110A-N.

The tunnel 502, once successfully established, creates an encrypted session between the client device 102 and the requested destination servers 110A-N. The tunnel server 109 may not have an ability to directly view tunnel contents. Thus, the requested destination servers 110A-N may provide features necessary for compliance with respect to monitoring and logging network traffic/activities. In some implementations, the tunnel 502 may be limited to only SSH traffic to prevent malicious use.

Advantageously, performing authentication checks at the tunnel server 109 and the destination servers 110A-N can help deter or otherwise prevent instances where users may try to access end points that they are not authorized to access. The system 500 presents a firewall-type approach to filter out those users who may attempt unauthorized access to one or more of the end points. The system 500 further provides the illustrative firewall 504 but also allows communication to go beyond the illustrative firewall 504 by leveraging certificates for ultimate end point authorization. The techniques described herein can provide for security best practices, reduce an amount of firewall rules that may typically be required. The disclosed techniques can also solve business needs since these techniques may reduce a quantity of PCI controls required. In other words, the disclosed techniques may only require PCI controls for the intermediate tunnel server 109 rather than all the destination servers 110A-N. The disclosed techniques allow communications to securely exist between trusted users at the client devices 102 to untrusted destination servers 110A-N having no trust relationship with the client device 102 or other devices/servers/systems in the enterprise's infrastructure.

FIG. 5B is a conceptual diagram of a system 520 that illustrates using enterprise IdP functionality to grant a user access to one or more destination servers 110A-N. The client device 102 can present or output a terminal application 526 that can be used to register or acknowledge enterprise login information, such as the user's enterprise IdP identity, for the user of the client device 102. If the client device 102 does not already have SSO credentials for the user, then the terminal application 524 may redirect the user interface presented at the client device 102 to a web browser so that the user can input their enterprise login information. Then, the terminal application 524 can be presented against the client device 102 so that the user can access one or more of the destination servers 110A-N. As described herein, the SSH system 108 can leverage the user's enterprise's IdP identity to determine authorization for that user, then mint an SSH certificate that specifies the IdP identity and a short TTL. The user can then request access to one or more of the servers 110A-N using the same SSH certificate and SSO credentials during the TTL. Once the TTL expires, a new SSH certificate can be generated for the user of the client device 102.

Traditionally, SSH systems and other types of secure communication protocol computing systems can be used to log a user into a server, but the user would need an account on that server to undergo an authentication process. As a result, it can be a time-consuming and challenging process to identify accounts across all servers within a data infrastructure to verify the user that is trying to log into the particular server. Moreover, if various user accounts share an admin group, it can be challenging to determine which user in the admin group is actually logging into the server since all the users in the group use the same admin group login. It can be challenging to track user activity at the server, identify malicious activity at the server, and associate the malicious activity with a particular user in the admin group.

The disclosed technology, as described herein, leverages the users' enterprise IdP login credentials (e.g., a single sign-on service, or a digital fingerprint) to authenticate the users and allow them to log into any of the servers 110A-N, which may be part of an enterprise data infrastructure or external that infrastructure. Also, when the user logs in, their enterprise IdP login credentials can be used as a unique ID to monitor who logs in and to associate activity at the servers 110A-N with the particular user.

As shown in FIG. 5B, the user at the client device 102 can provide, as input at the terminal 524 of the client device 102, their enterprise login, which is transmitted to the data store 104 (block 526). In other words, the user can log into the enterprise's data infrastructure by providing their enterprise login. The enterprise login can be an enterprise IdP identity or other login credentials used at the enterprise. For example, the enterprise login can be an email address, such as "first.last@domain.com." Since the user is logging in with an enterprise account in block 526, the identity of the user can be known rather than an admin group that the user is associated with.

Once the data store 104 receives the enterprise login for the particular user at the client device 102, the data store 104 can return a corresponding enterprise ID for the user (block 528). The enterprise ID can be an IdP identity associated with the user's enterprise login. The enterprise ID can also be a LAN ID, as described herein. The data store 104 can, in some implementations, return the enterprise ID coupled with a token. The token can authenticate and/or validate that the particular user has logged into the enterprise infrastructure. In some implementations, the enterprise login of block 526 can be transmitted to the transporter system 106 or another computing system, which can then communicate with the data store 104 to retrieve the enterprise ID for the particular user (block 528) and provide that enterprise ID back to the client device 102.

The enterprise ID and/or the token returned to the client device 102 can then be used to generate a certificate for the user and authenticate the user's certificate across various of the destination servers 110A-N. The user's identity (e.g., their enterprise ID) can be minted into the certificate to provide a high level of assurance that the user is who they say they are and that they are authorized to access the various destination servers 110A-N.

For example, the ID and/or token can be used to run the transporter system 106 (block 530). The transporter system 106 can run in the background when the terminal 524 is presented at the client device 102 or another window, such as a web browser interface, is launched at the client device 102. The another window can be used by the user to access one or more services provided by the servers 110A-N.

The client device 102 can transmit the enterprise ID (and/or the token) to the transporter system 106 (block 530). The transporter system 106 can obtain group information associated with the user's enterprise ID from the data store 104 (block 532). The data store 104 can maintain groups information 552A-N, which can include credentials for a plurality of different groups that may be authorized to access one or more of the destination servers 110A-N that are inside the enterprise infrastructure and external the infrastructure.

The transporter system 106 can validate the obtained group information for the enterprise ID in block 534. Once validated, the transporter system 106 can communicate with the SSH system 108 to create an SSH certificate for the user of the client device 102 (block 536). The certificate can be created, minted, and signed with the validated group information. The user's enterprise ID can be minted into the SSH certificate to provide assurance of the user's identity. The certificate can be generated with a TTL. Once the TTL expires, a new certificate can be generated for the user's enterprise ID. The TTL can be any threshold amount of time. For example, the TTL can be 15 minutes. The TTL can be one or more other amounts of time, including but not limited to 5 minutes, 10 minutes, 20 minutes, 25 minutes, 30 minutes, etc. During the TTL, the user can request access to any of the servers 110A-N and the servers 110A-N can authenticate the user's certificate with the SSH system 108, as described herein.

The generated SSH certificate can be stored in a secure, encrypted SSH certificates data store 522 (block 538). The certificate can also be transmitted back to the transporter system 106 and then to the client device 102 with the group information therein (block 540). The client device 102 can maintain the certificate for the TTL. The SSH certificate can be added to an SSH agent or other local agent on the client device 102. The SSH agent of the client device 102 can then request access to the one or more servers 110A-N using the certificate (block 542). As described throughout this disclosure, the certificate can be validated and checked by one or more of the destination servers 110A-N to determine whether the user is part of an authorized group to access the respective server. Each of the servers 110A-N can be preconfigured with respective authorized groups. For example, the server 110A can be preconfigured with authorized groups 546A-N, the server 110B can be preconfigured with authorized groups 548A-N, and the server 110N can be preconfigured with authorized groups 550A-N. If the group information in the user's certificate matches any of the authorized groups 546A-N, 548A-N, and 550A-N, the client device 102 may be granted access to the respective server 110A, 110B, and/or 110N. In other words, a secure SSH tunnel connection can be established and the client device 102 can interact with the one or more destination servers 110A-N via the tunnel connection.

FIG. 6 illustrates an example SSH certificate 600 used with the disclosed technology. As described herein, the certificate 600 can be created for a user of a client device when the user logs into an enterprise infrastructure. The certificate 600 can then be used by the client device to request access to one or more servers, which can be part of the enterprise infrastructure and/or external the infrastructure, such as non-core segments of the infrastructure and servers in a cloud-based environment.

The certificate 600 is encrypted and signed by at least the transporter system 106. The certificate 600 may not be altered once issued (unless those alterations are made by the same authority that created and minted the certificate 600). In some implementations, the certificate 600 itself can be a signed public key in plain text. A unique user private key may correspond to the public key in plain text. If the user has the private key, then the certificate may only be valid for that user. The public and private keys may expire after a TTL, which can be defined at time of creating, minting, and signing the certificate 600. The TTL can be 15 minutes since certificate creation. In some implementations, the TTL can be longer or shorter.

The illustrative certificate 600 can include a certificate type 602, a public key 604, a signing certificate authority identifier 606, a key user identifier 608, a key valid timeframe 610, authorized groups 612A-N, and extensions 614A-N. The certificate type 602 can indicate whether the certificate is minted for a particular user and/or a type of the certificate, such as an SSH certificate. The public key 604 can match the user's private key and can be sent in a request from the client device to encrypt an SSH connection or transaction. The public key 604 can be used to sign the certificate 600. The public key 604 can also be used to build trust that the certificate 600 is associated with the one user and the one user is authorized to access destination servers that correspond to the authorized groups 612A-N in the certificate 600. The identifier 606 identifies an authority that is allowed to sign the certificate 600 using the public key 604. The public key 604 is what the user is authenticating with. The identifier 606 is what proves there is trust.

The key user identifier 608 can be a unique identifier for the user associated with the certificate 600. Sometimes, the identifier 608 can be an enterprise login or other information that the user uses to log into an enterprise infrastructure. The key valid timeframe 610 can be a TTL, which indicates how long the keys last for the certificate 600. Once the TTL ends/expires, new keys are needed/a new certificate is generated for the user.

The authorized groups 612A-N, or group/authorized principal credentials, can indicate which group or groups the user of the certificate 600 is associated with. In some implementations, the certificate 600 can be minted with all the groups 612A-N that the user is part of (based on using the key user identifier 608 to match the user with authorized groups in a data store). In some implementations, the certificate 600 can be minted only with the groups 612A-N that the user is part of and that are authorized for the destination servers that the user requests to access. The user may not simply add themselves to one or more groups. Only certain users in the enterprise infrastructure may have permissions to modify the groups and who is part of each of the groups.

The extensions 614A-N can indicate one or more types of actions that the certificate 600 permits for the user's client device and destination servers. For example, the extensions 614A-N may include permit agent forwarding, permit port forwarding, permit pty, etc. Permit agent forwarding can allow for forwarding local SSH agent keys to a remote host, such as at a destination server. Permit port forwarding can allow for tunnel connections from local to remote hosts and/or from remote to local hosts. Permit pty can allow for interactive terminal sessions with SSH certificate authority signing for the TTL or another predetermined period of time.

Figure 7:
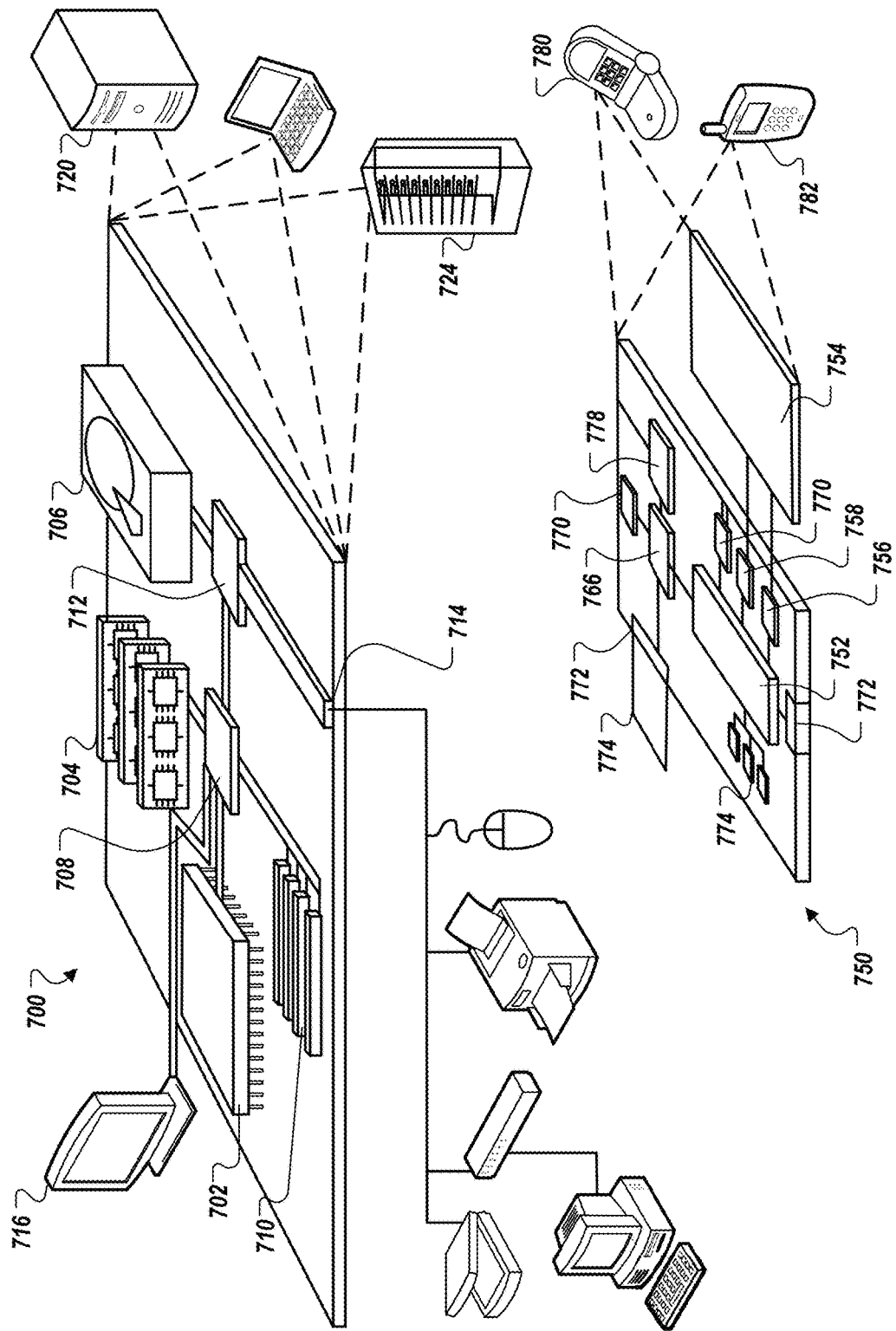
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this disclosure.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for authenticating access to one or more servers using enterprise credentials, the method comprising:
    generating, by a client device operating within an enterprise environment, a request to access at least one destination server, wherein the request includes a token authenticating a user of the client device within the enterprise environment;

generating, by the client device, a secure shell (SSH) certificate for a user of the client device based on the token;

transmitting, by the client device, the request and the SSH certificate to a computer system that is configured to update and sign the SSH certificate based on authorized group information associated with the user of the client device, wherein the computer system is configured to perform operations comprising:

retrieving, from a data store and based on the token, the authorized group information associated with the user, verifying, based on the retrieved authorized group information, that the client device is authorized to access the at least one server, updating, in response to the verifying, the SSH certificate with the retrieved authorized group information, signing the updated SSH certificate, and returning the signed SSH certificate to the client device;

receiving, by the client device, the signed SSH certificate comprising the authorized group information; and returning, by the client device, the request and the signed SSH certificate comprising the authorized group information to a tunnel server that is configured to establish and provide secure connections to a plurality of destination servers, wherein the plurality of destination servers comprises the at least one destination server, wherein the tunnel server is preconfigured with authorized group credentials corresponding to the plurality of destination servers that are accessible from the tunnel server, wherein the tunnel server is configured to perform operations comprising:

validating the signed SSH certificate based on determining that the authorized group information in the signed SSH certificate match the preconfigured authorized group credentials for the at least one destination server, and establishing, in response to validating the signed SSH certificate, an SSH tunnel between the client device and the at least one destination server, wherein the at least one destination server is only accessible, by the client device, through the SSH tunnel that is established by the tunnel server, and wherein once the SSH tunnel is established, the client device is configured to communicate, through the tunnel server, with the at least one destination server and without requiring additional checks to be performed at the at least one destination server to validate the signed SSH certificate or the authorized group information associated with the user of the client device.

2. The method of claim 1, wherein the at least one destination server is external the enterprise environment.

3. The method of claim 1, wherein the at least one destination server is within the enterprise environment.

4. The method of claim 1, wherein the plurality of destination servers comprises the tunnel server.

5. The method of claim 1, further comprising:

receiving, by the client device, a notification indicating that a secure tunnel connection is established between the client device and the at least one destination server; and remotely accessing, by the client device, the at least one destination server via the SSH tunnel.

6. The method of claim 1, comprising:

authenticating, by the client device, the user with an enterprise identity provider ("IdP") system that is configured to authenticate the user based on user enterprise credentials transmitted by the client device to the enterprise IdP system, wherein the user enterprise credentials include at least an enterprise identifier for the user; and receiving, at the client device and in response to the user being authenticated, the token from the enterprise IdP system, wherein the token authenticates the enterprise credentials for the user within the enterprise environment.

7. The method of claim 1, wherein updating the SSH certificate comprises setting a time to live (TTL) for the SSH certificate, wherein the TTL comprises a time period during which the SSH certificate is valid to authenticate remote access to the at least one destination server.

8. The method of claim 7, wherein the TTL is 15 minutes from updating the SSH certificate.

9. The method of claim 7, wherein, when the TTL expires, the computer system is configured to update and sign a new SSH certificate for the user of the client device.

10. The method of claim 1, wherein the authorized group information for the user comprises credentials corresponding to groups that the user is part of and that have access to one or more servers, the one or more servers being at least one of (i) within the enterprise environment or (ii) external the enterprise environment.

11. The method of claim 1, further comprising: updating, by the client device, an SSH agent on the client device to use the SSH certificate with the authorized group information for the user.

12. The method of claim 1, wherein the at least one destination server is further configured to authenticate remote access by the client device based, at least in part, on a determination of whether the authorized group information in the SSH certificate corresponds to a particular authorized group credential that is associated with the at least one destination server.

13. The method of claim 1, wherein each of the plurality of destination servers are preconfigured with authorized group credentials corresponding to the destination server.

14. The method of claim 1, wherein the SSH certificate comprises one or more extensions, the extensions comprising at least one of: permit port forwarding, permit agent forwarding, or permit pty.

15. The method of claim 1, wherein the SSH certificate comprises a unique identifier for the user of the client device.

16. The method of claim 15, wherein the unique identifier comprises a personal LAN ID for the user within the enterprise environment.

17. The method of claim 15, wherein the unique identifier comprises an enterprise identifier of the user used for logging the user into the enterprise environment.

18. The method of claim 1, wherein the SSH certificate comprises a public key of a key pair generated for the SSH certificate, wherein the public key is at least used by the SSH CA to sign the SSH certificate.

19. The method of claim 1, wherein the computer system is a certificate service that is configured to generate and store a public-private key pair based on the token for the user, to provide the public key to the SSH CA for signing, and to provide the signed public key to the client device as the SSH certificate.

20. A system for authenticating access to one or more servers external an enterprise environment using enterprise credentials, the system comprising:

an enterprise environment;
a client device operating within the enterprise environment;
a plurality of destination servers;
a tunnel server preconfigured with authorized group credentials corresponding to the plurality of destination servers, wherein the tunnel server is configured to (i) perform an authentication process to authorize a request from the client device to access at least one destination server of the plurality of destination servers, and (ii) establish and provide secure connections to the plurality of destination servers; and
a computer system configured to (i) identify authorized group information for users of client devices within the enterprise environment and (ii) update and sign secure shell (SSH) certificates with the authorized group information for the users of the client devices within the enterprise environment,
wherein the client device is configured to perform operations comprising:
    generating a request to access the at least one destination server amongst the plurality of destination servers, wherein the request includes a token authenticating a user of the client device within the enterprise environment;
    generating a secure shell (SSH) certificate for a user of the client device based on the token;
    transmitting the request and the SSH certificate to the computer system, wherein, in response to receiving the request and the SSH certificate, the computer system is configured to use the token to (i) obtain an SSH certificate signed by an SSH certificate authority (CA), (ii) identify authorized group information for the user based on the token, and (iii) mint the SSH certificate with the retrieved authorized group information perform operations comprising:
        retrieving, from a data store and based on the token, the authorized group information associated with the user,
        verifying, based on the retrieved authorized group information, that the client device is authorized to access the at least one server,
        updating, in response to the verifying, the SSH certificate with the retrieved authorized group information,
        signing the updated SSH certificate, and
        returning the signed SSH certificate to the client device;
    receiving the signed SSH certificate comprising the authorized group information; and
    returning the request and the signed SSH certificate comprising the authorized group information to the tunnel server to access the at least one destination server, wherein, in response to receiving the request and the signed SSH certificate, the tunnel server is configured to perform operations comprising:
        validating the signed SSH certificate based on determining that the authorized group information in the signed SSH certificate match the preconfigured authorized group credentials for the at least one destination server, and
        establishing, in response to validating the signed SSH certificate, an SSH tunnel between the client device and the at least one destination server,
wherein the at least one destination server is only accessible, by the client device, through the SSH tunnel that is established by the tunnel server, and
wherein once the SSH tunnel is established, the client device is configured to communicate, through the tunnel server, with the at least one destination server and without requiring additional checks to be performed at the at least one destination server to validate the signed SSH certificate or the authorized group information associated with the user of the client device.

\* \* \* \* \*